(12) United States Patent
Yamagiwa et al.

(10) Patent No.: US 10,229,665 B2
(45) Date of Patent: *Mar. 12, 2019

(54) POROUS SOUND ABSORBING STRUCTURE

(71) Applicant: Kobe Steel, Ltd., Hyogo (JP)

(72) Inventors: Ichiro Yamagiwa, Kobe (JP); Zenzo Yamaguchi, Kobe (JP); Akio Sugimoto, Nagoya (JP); Yoshikazu Mukai, Nagoya (JP); Hideki Ishitobi, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 350 days.

This patent is subject to a terminal disclaimer.

(21) Appl. No.: 15/235,537

(22) Filed: Aug. 12, 2016

(65) Prior Publication Data

US 2016/0351180 A1    Dec. 1, 2016

Related U.S. Application Data

(63) Continuation of application No. 14/419,570, filed as application No. PCT/JP2013/072992 on Aug. 28, 2013, now Pat. No. 9,453,336.

(30) Foreign Application Priority Data

Sep. 4, 2012   (JP) .................................. 2012-194106

(51) Int. Cl.
   *G10K 11/168*   (2006.01)
   *B60R 13/08*   (2006.01)
   (Continued)

(52) U.S. Cl.
   CPC ............ *G10K 11/168* (2013.01); *B60R 13/08* (2013.01); *B60R 13/0815* (2013.01);
   (Continued)

(58) Field of Classification Search
   CPC ..... B60R 13/08; B60R 13/0838; G10K 11/16; G10K 11/168; B62D 25/10; B62D 25/105; B62D 25/02
   See application file for complete search history.

(56) References Cited

U.S. PATENT DOCUMENTS 2,159,488 A   5/1939   Parkinson
2,966,954 A   1/1961   Sabine
(Continued)

FOREIGN PATENT DOCUMENTS

CN    1846251 A    10/2006
CN    1947170 A    4/2007
(Continued)

OTHER PUBLICATIONS

International Search Report; PCT/JP2013/072992; dated Sep. 24, 2013.
(Continued)

*Primary Examiner* — Edgardo San Martin
(74) *Attorney, Agent, or Firm* — Studebaker & Brackett PC

(57) ABSTRACT

A porous sound absorbing structure according to the present invention includes an outer material 2 having a smooth curved shape, an inner material 3 having an uneven shape with a perimeter thereof combined with a perimeter of the outer material 2 to form a hollow portion S between the outer material 2 and the inner material, and a reinforcing plate material 4 having a large number of through holes 5, the reinforcing plate material being attached to a surface of the inner material 3 on the side of the hollow portion S in such a manner that an air layer is formed between the reinforcing plate material and the surface. A sound absorbing property is given to an interior of the hollow portion S by the reinforcing plate material 4.

16 Claims, 8 Drawing Sheets

(51) Int. Cl.
*B62D 25/10* (2006.01)
*E04B 1/84* (2006.01)
*G10K 11/26* (2006.01)
*G10K 11/16* (2006.01)
*B62D 25/08* (2006.01)

(52) U.S. Cl.
CPC ............ *B60R 13/0838* (2013.01); *E04B 1/84* (2013.01); *G10K 11/26* (2013.01)

(56) References Cited

U.S. PATENT DOCUMENTS

| | | | |
|---|---|---|---|
| 5,997,985 | A | 12/1999 | Clarke et al. |
| 7,434,660 | B2 | 10/2008 | Yamagiwa et al. |
| 7,654,364 | B2 | 2/2010 | Yamaguchi et al. |
| 7,963,363 | B2 | 6/2011 | Niwa et al. |
| 7,988,222 | B2 | 8/2011 | Fujimoto |
| 8,109,361 | B2 | 2/2012 | Tsugihashi et al. |
| 9,453,336 | B2 * | 9/2016 | Yamagiwa ............ G10K 11/168 |
| 2005/0133302 | A1 | 6/2005 | Pfaffelhuber et al. |
| 2006/0096183 | A1 | 5/2006 | Yamaguchi et al. |
| 2006/0131104 | A1 | 6/2006 | Yamaguchi et al. |
| 2006/0169531 | A1 | 8/2006 | Volker |
| 2006/0289229 | A1 | 12/2006 | Yamaguchi |
| 2007/0272482 | A1 | 11/2007 | Yamaguchi et al. |
| 2008/0128200 | A1 | 6/2008 | Tsugihashi et al. |
| 2008/0128201 | A1 | 6/2008 | Yamaguchi et al. |
| 2009/0084627 | A1 | 4/2009 | Tsugihashi et al. |
| 2009/0195031 | A1 | 8/2009 | Ishitobi |
| 2009/0197044 | A1 | 8/2009 | Pelzer et al. |
| 2010/0175949 | A1 | 7/2010 | Yamaguchi et al. |

FOREIGN PATENT DOCUMENTS

| | | |
|---|---|---|
| CN | 101395057 A | 3/2009 |
| JP | 2005-099789 A | 4/2005 |
| JP | 2005-338795 A | 12/2005 |
| JP | 2006-199276 A | 8/2006 |
| JP | 2007-245853 A | 9/2007 |
| JP | 2008-009014 A | 1/2008 |
| JP | 2012-013912 A | 1/2012 |

OTHER PUBLICATIONS

Written Opinion of the International Searching Authority; PCT/JP2013/072992; dated Sep. 24, 2013.

* cited by examiner

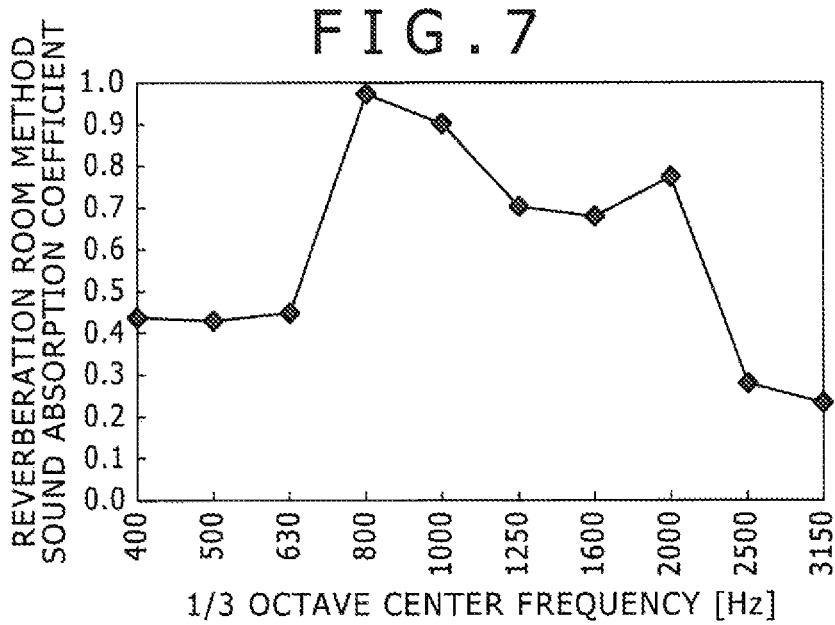
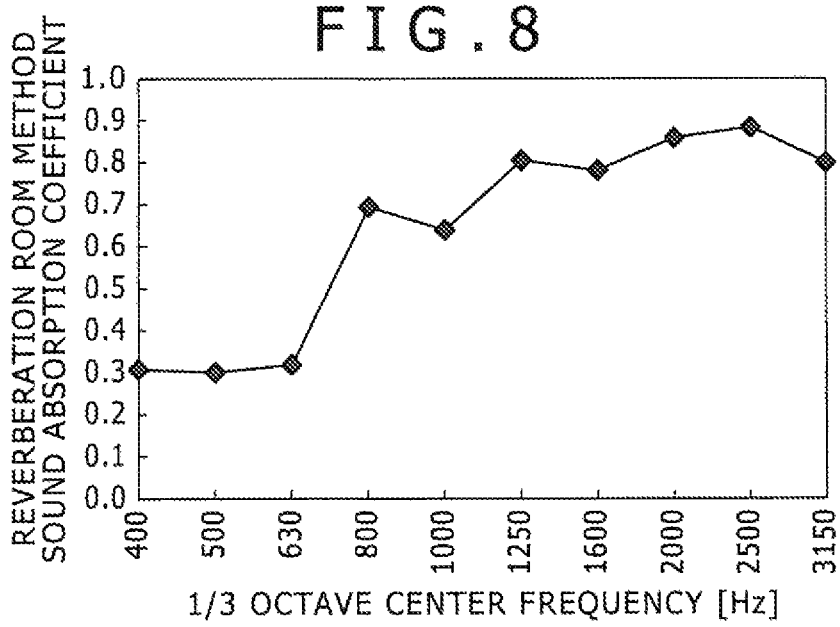

POROUS SOUND ABSORBING STRUCTURE

TECHNICAL FIELD

The present invention relates to a porous sound absorbing structure having a sound absorbing property. Further, the present invention relates to a porous sound absorbing structure to be favorably applied to parts forming an automobile.

BACKGROUND ART

This type of technique is described in Patent Document 1 for example. In a sound absorbing structure described in Patent Document 1, a fiber material and a porous plate are provided so as to overlie each other, and an air layer is provided behind the porous plate or the fiber material. Density $\rho$ (kg/m$^3$) of the fiber material and thickness t (mm) of the fiber material preferably satisfy the relationship of $\rho \times t \geq 0.01$ kg/m$^2$.

CITATION LIST

Patent Document

[Patent Document 1] JP 2006-199276 A

SUMMARY OF INVENTION

Problems to be Solved by Invention

In a case where the sound absorbing structure described in Patent Document 1 is applied to a hood (also called as a bonnet) of an automobile for example, the fiber material (fiber sound absorbing material) is attached to a lower surface (on the side of an engine) of an inner material (porous plate) of the hood (refer to FIG. 1 of Patent Document 1).

Meanwhile, from a viewpoint to protect pedestrians (to absorb shock), a large distance between the inner material and the engine is led to improvement of a shock absorbing property. Therefore, reduction of a space in an engine room by attaching the fiber sound absorbing material to the lower surface of the inner material is desirably avoided as far as possible.

A sound absorption coefficient of the inner material (porous plate) is maximized with a particular frequency which is determined by a hole diameter thereof, a hole pitch, and a distance between the inner material and an outer material (thickness of the air layer). When the distance between the inner material and the outer material is relatively large, a high-frequency sound is not easily absorbed only by the inner material (porous plate). This is because with thickness of the air layer being increased, the inner material (porous plate) comes to absorb a low-frequency sound. It should be noted that normally, the distance between the inner material and the outer material cannot be determined while assigning a priority to giving the sound absorbing property.

Therefore, in the sound absorbing structure described in Patent Document 1, by the fiber material (fiber sound absorbing material), a high-frequency sound such as 1 kHz or higher is absorbed. Thus, when the fiber sound absorbing material is simply taken off from the lower surface of the inner material in order not to reduce the space in the engine room, there is a concern that the sound absorbing property for the high-frequency sound is lowered.

The present invention is achieved in consideration with the situation described above, and an object thereof is to provide a porous sound absorbing structure capable of easily increasing a frequency range with which a sound absorption coefficient is great without attaching a fiber sound absorbing material to a lower surface of an inner material (inside material).

Means for Solving Problems

The present invention is a porous sound absorbing structure including an outside material having a smooth curved shape, an inside material having an uneven shape with a perimeter thereof combined with a perimeter of the outside material to form a hollow portion between the outside material and the inside material, and a reinforcing plate material having a large number of through holes, the reinforcing plate material being attached to a surface of at least any of the outside material and the inside material on the side of the hollow portion in such a manner that an air layer is formed between the reinforcing plate material and the surface. In this porous sound absorbing structure, a sound absorbing property is given to an interior of the hollow portion by the reinforcing plate material.

Effects of Invention

The reinforcing plate material is positioned between the outside material (outer material) and the inside material (inner material). Therefore, thickness of the behind air layer of the reinforcing plate material is smaller than for example the thickness of the behind air layer of the porous plate (inner material) described in Patent Document 1 under the same conditions. When the thickness of the behind air layer is decreased, the reinforcing plate material having a large number of through holes absorbs a higher-frequency sound for a decreased amount of the thickness of the behind air layer.

The original function (role) of the reinforcing plate material is to reinforce the outside material and/or the inside material. By utilizing the reinforcing plate material, without adding a new member for giving a sound absorbing property to an object item, that is, easily, the sound absorbing property can be given to the object item.

In such a way, according to the present invention, a frequency range with which a sound absorption coefficient is great can be easily increased without attaching a fiber sound absorbing material to a lower surface of the inner material (inside material).

BRIEF DESCRIPTION OF DRAWINGS

FIG. 7 is a graph showing a sound absorbing property of the hood shown in FIGS. 2(a) and 2(b).

FIG. 8 is a graph showing a sound absorbing property of the hood shown in FIGS. 3(a) and 3(b).

MODES FOR CARRYING OUT INVENTION

Hereinafter, modes for carrying out the present invention will be described with reference to the drawings. Examples of a case where a porous sound absorbing structure of the present invention is applied to parts forming an automobile will be shown below. It should be noted that an object to which the present invention is applied is not limited to the parts forming the automobile.

Hood (First Embodiment)

Figure 1:
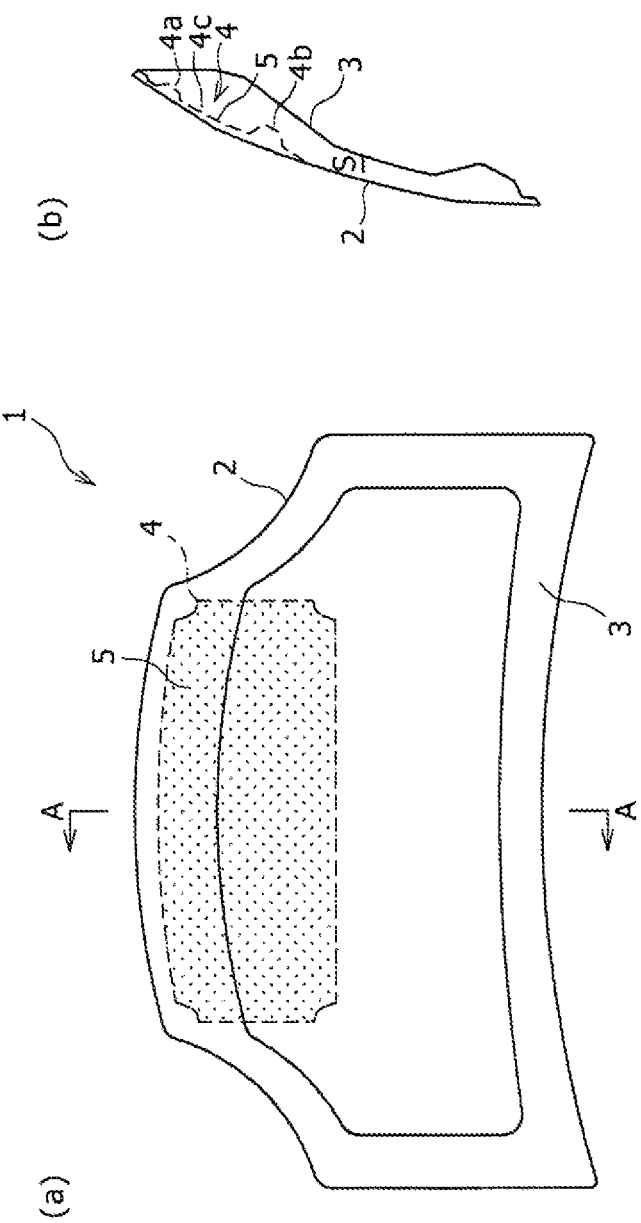
FIG. 1(a) is a view in which a first embodiment of a hood of an automobile to which a porous sound absorbing structure of the present invention is applied is seen from the back.
FIG. 1(b) is a sectional view taken along the line A-A of FIG. 1(a).

FIGS. 1 to 4 are views showing examples of a case where the porous sound absorbing structure of the present invention is applied to a hood (also called as a bonnet) of the automobile. FIG. 1 among FIGS. 1 to 4 shows a hood 1 (porous sound absorbing structural body) of a first embodiment. FIG. 1(a) is a view in which the hood 1 is seen from the back, and FIG. 1(b) is a sectional view taken along the line A-A of FIG. 1(a).

As shown in FIGS. 1(a) and 1(b), the hood 1 is formed by bonding an outer material 2 (outside material) having a smooth curved shape and an inner material 3 (inside material) having an uneven shape at perimeter portions thereof by means of welding or the like.

A reinforcing plate material 4 is housed in a hollow portion S formed between the outer material 2 and the inner material 3. The reinforcing plate material 4 is fixed to a surface of the outer material 2 on the side of the hollow portion S at a perimeter portion (edge portion) thereof.

The outer material 2 of the hood 1 is a thin plate in order to ease shock at the time of collision against pedestrians from a viewpoint to protect pedestrians or from a viewpoint to reduce weight and cost and the like. Therefore, the reinforcing plate material 4 is attached to a back surface of the outer material 2 so that the outer material 2 is not easily dented when being pressed by a person.

Materials of the outer material 2, the inner material 3, and the reinforcing plate material 4 are aluminum or an aluminum alloy. It should be noted that metal materials such as iron may be used as the materials of the outer material 2, the inner material 3, and the reinforcing plate material 4.

As shown in FIG. 1(a), in the present example, the reinforcing plate material 4 is formed in a substantially oblong shape. As shown in FIG. 1(b), a sectional shape of the reinforcing plate material 4 has two mountain portions 4a, 4b, and a part between the mountain portions 4a, 4b serves as a valley portion 4c having predetermined width. An air layer (behind air layer) is formed between the mountain portions 4a, 4b and the valley portion 4c, and the outer material 2. It should be noted that the shape of the reinforcing plate material 4 shown in FIG. 1(a) is one example. That is, the reinforcing plate material in the present invention is not limited to the one having the shape of the present embodiment.

The reinforcing plate material 4 may also be fixed to a surface of not the outer material 2 but the inner material 3 on the side of the hollow portion S in a mode where an air layer is formed between the reinforcing plate material and the surface. Further, reinforcing plate materials may be respectively fixed to the surfaces of the outer material 2 and the inner material 3 respectively on the side of the hollow portion S in a mode where air layers are formed between the reinforcing plate materials and the surfaces.

In the present invention, by providing a large number of holes 5 (through holes) in this reinforcing plate material 4, a sound absorbing property is given to an interior of the hollow portion S. A sound absorption coefficient of the reinforcing plate material 4 is maximized with a particular frequency which is determined by a diameter of the holes 5, a pitch of the holes 5, and a distance between the reinforcing plate material 4 and the outer material 2 (thickness of the behind air layer). It should be noted that thickness of the behind air layer can be changed by the sectional shape of the reinforcing plate material 4.

From a viewpoint of mass-productivity, a diameter $d_1$ (mm) of the holes 5 is preferably $0.7\,t_1 \le d_1 \le 1.3\,t_1$. It should be noted that $t_1$ (mm) denotes plate thickness of the reinforcing plate material 4. The plate thickness $t_1$ (mm) of the reinforcing plate material 4 is approximately $0.8 \le t_1 \le 1.2$. It should be noted that plate thickness of the outer material 2 and the inner material 3 is also approximately 0.8 mm or more and 1.2 mm or less. The holes 5 are provided so that strength of the reinforcing plate material 4 does not become less than the strength that the reinforcing plate material should have. That is, the number and the pitch of the holes 5 are determined in consideration with the strength of the reinforcing plate material 4.

Hood (Second Embodiment)

Figure 2:
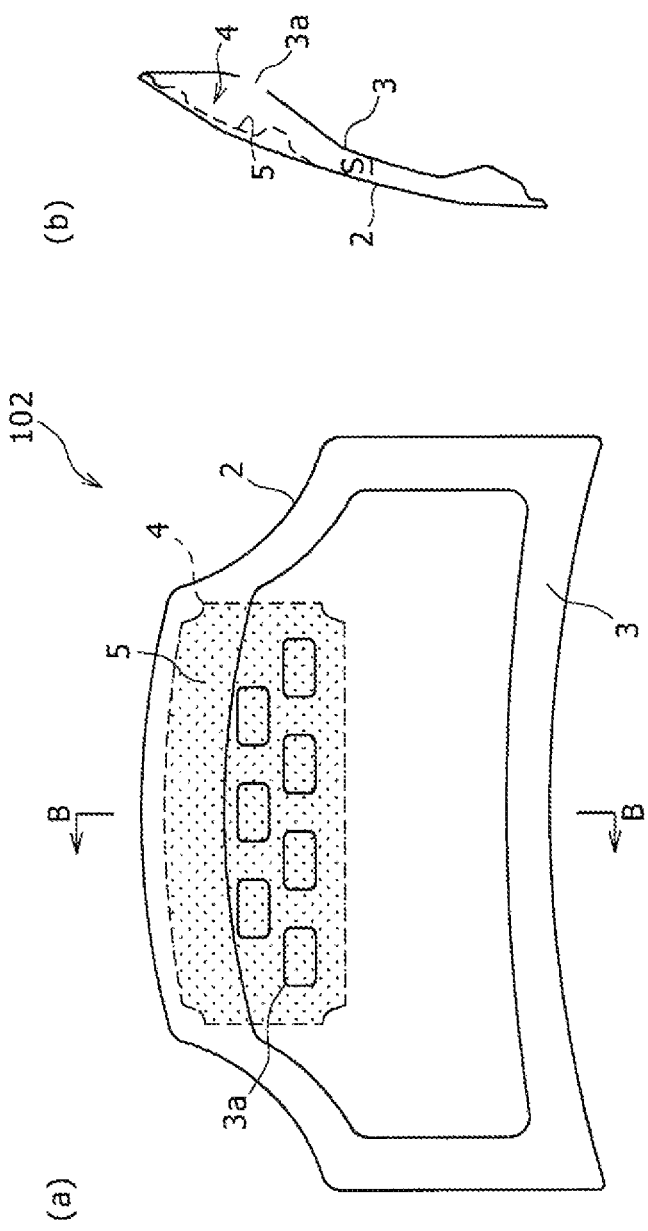
FIG. 2(a) is a view in which a second embodiment of a hood of the automobile to which the porous sound absorbing structure of the present invention is applied is seen from the back.
FIG. 2(b) is a sectional view taken along the line B-B of FIG. 2(a).

FIG. 2 shows a hood 102 of a second embodiment. FIG. 2(a) is a view in which the hood 102 is seen from the back, and FIG. 2(b) is a sectional view taken along the line B-B of FIG. 2(a). In FIGS. 2(a) and 2(b), similar members to those of the hood 1 of the first embodiment will be given the same reference numerals (the same is applied to the other embodiments).

A difference between the hood 102 and the hood 1 shown in FIGS. 1(a) and 1(b) is a point that opening portions 3a are provided in the inner material 3 in the hood 102.

On the back surface side of the hood 102, that is, on the right side of the hood 102 in FIG. 2(b), an engine is positioned in a state where the hood 102 is closed. The opening portions 3a are to guide a sound (sound waves) produced by the engine to the reinforcing plate material 4 placed in the hollow portion S and provided with a large number of holes 5. In the present embodiment, the opening portions 3a are provided at positions to face the reinforcing plate material 4 so that the sound (sound waves) is easily guided to the reinforcing plate material 4. The plurality of opening portions 3a is arranged in a zigzag manner. It should be noted that although the plurality of opening portions 3a is provided in the inner material 3 in this example, the number of the opening portions 3a may be one. A shape of the opening portions 3a is not limited to an oblong shape.

Hood (Third Embodiment)

Figure 3:
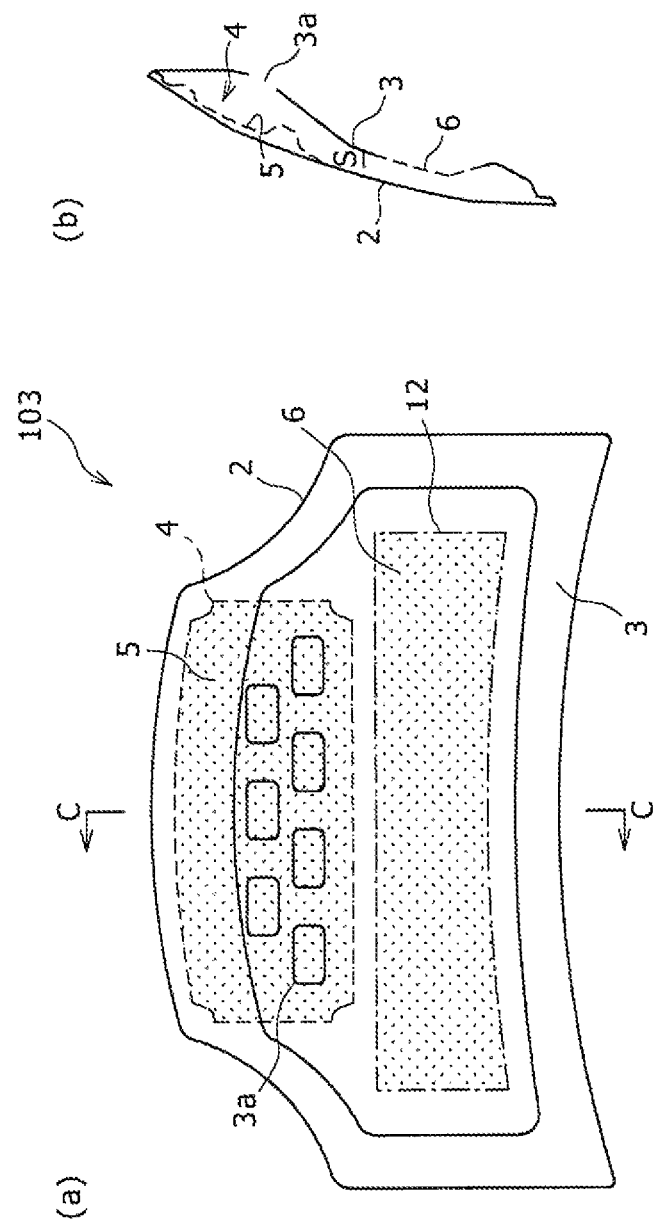
FIG. 3(a) is a view in which a third embodiment of a hood of the automobile to which the porous sound absorbing structure of the present invention is applied is seen from the back.
FIG. 3(b) is a sectional view taken along the line C-C of FIG. 3(a).

FIG. 3 shows a hood 103 of a third embodiment. FIG. 3(a) is a view in which the hood 103 is seen from the back, and FIG. 3(b) is a sectional view taken along the line C-C of FIG. 3(a).

A difference between the hood 103 and the hood 102 shown in FIGS. 2(a) and 2(b) is a point that in the hood 103, not only the reinforcing plate material 4 but also the inner material 3 is provided with a large number of holes 6 (through holes), so that the sound absorbing property is given to the inner material 3 itself.

The reinforcing plate material 4 provided with a large number of holes 5 is arranged in a front part of the hood 103 in a plan view of the hood 103. The opening portions 3a are also provided on the front part side of the hood 103 (inner material 3) in accordance with the reinforcing plate material 4. Meanwhile, a position of a sound absorbing portion 12 (region where the holes 6 are provided) formed in the inner material 3 itself is set on the rear side of the reinforcing plate material 4 and the opening portions 3a. That is, the position of the sound absorbing portion 12 is set on the rear side of the center of the hood 103 (inner material 3). In such a mode, when seen from the engine (sound source), the reinforcing plate material 4 and the sound absorbing portion 12 are displaced from each other so as to be set at positions not overlying each other.

Since the reinforcing plate material 4 and the sound absorbing portion 12 are displaced from each other when seen from the engine (sound source), an air layer on the back side of the porous plate portions (the reinforcing plate material 4 and the sound absorbing portion 12) becomes a behind air layer more suitable for sound absorption. Regarding the sound absorbing portion 12, this is because an opposing surface on the back side of the porous plate portion can be surely closed. The sound from the engine (sound source) is easily introduced to the respective porous plate portions (the reinforcing plate material 4 and the sound absorbing portion 12). Thereby, the sound absorbing property is more improved.

It should be noted that the positions of the opening portions 3a further preferably come closer to a front side end (one end) of the hood 103 (inner material 3) than the positions shown in FIG. 3. Thereby, a distance between the opening portions 3a and the sound absorbing portion 12 is increased. When the distance between the opening portions 3a and the sound absorbing portion 12 is large, an influence of the opening portions 3a on a sound absorbing performance of the sound absorbing portion 12 is reduced. When the distance between the sound absorbing portion 12 and the opening portions 3a is decreased, the behind air of the sound absorbing portion 12 easily comes in to and out from the opening portions 3a. Thus, a valid behind air layer is extended, so that the designed sound absorbing performance of the sound absorbing portion 12 cannot be exhibited. Meanwhile, by increasing the distance between the sound absorbing portion 12 and the opening portions 3a, an influence of the opening portions 3a on the behind air layer of the sound absorbing portion 12 is reduced. As a result, the designed sound absorbing performance of the sound absorbing portion 12 can be efficiently exhibited. Thereby, the sound absorbing property is further improved for the whole hood 103. In such a way, the opening portions 3a and the sound absorbing portion 12 are preferably estranged from each other by as a long distance as possible.

From a viewpoint of mass-productivity, a diameter $d_2$ (mm) of the holes 6 is preferably $0.7\ t_2 \leq d_2 \leq 1.3\ t_2$. It should be noted that $t_2$ (mm) denotes plate thickness of the inner material 3. The same relationship between the hole diameter and the plate thickness is applied to a case where holes for giving the sound absorbing property are provided in the outer material 2.

Hood (Fourth Embodiment)

Figure 4:
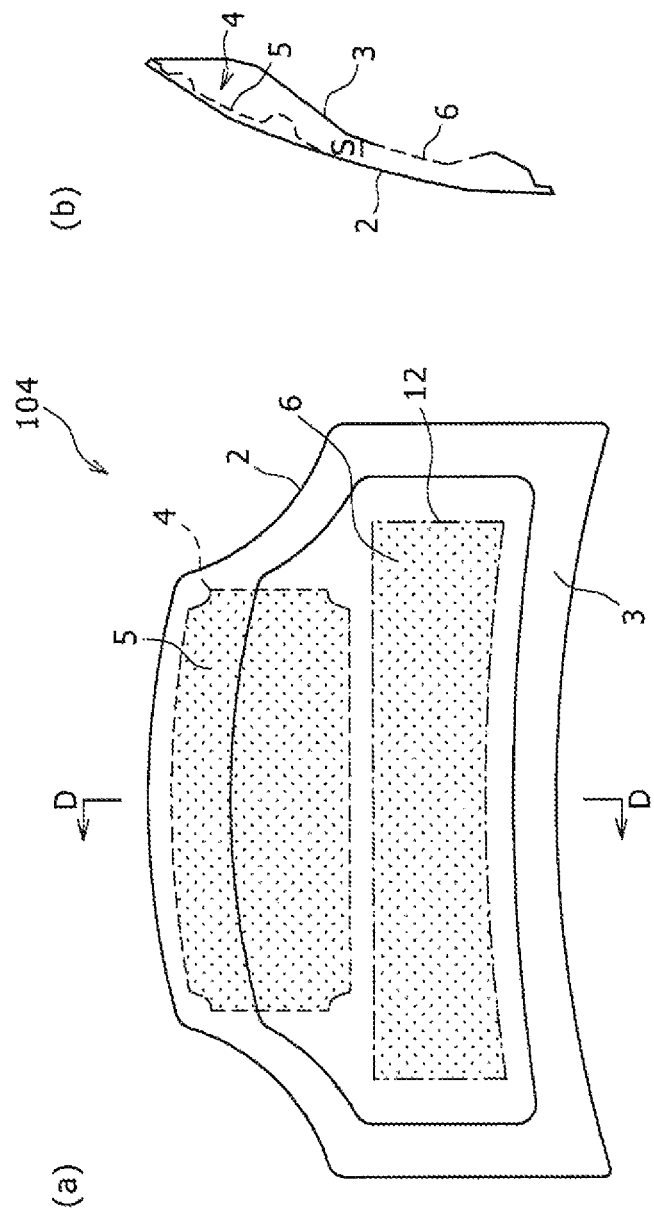
FIG. 4(a) is a view in which a fourth embodiment of a hood of the automobile to which the porous sound absorbing structure of the present invention is applied is seen from the back.
FIG. 4(b) is a sectional view taken along the line D-D of FIG. 4(a).

FIG. 4 shows a hood 104 of a fourth embodiment. FIG. 4(a) is a view in which the hood 104 is seen from the back, and FIG. 4(b) is a sectional view taken along the line D-D of FIG. 4(a).

A difference between the hood 104 and the hood 103 shown in FIGS. 3(a) and 3(b) is a point that the inner material 3 of the hood 104 is not provided with the opening portions 3a for guiding the sound (sound waves) to the reinforcing plate material 4. The other structures of the hood 104 are the same as those of the hood 103.

(Door)

Figure 5:
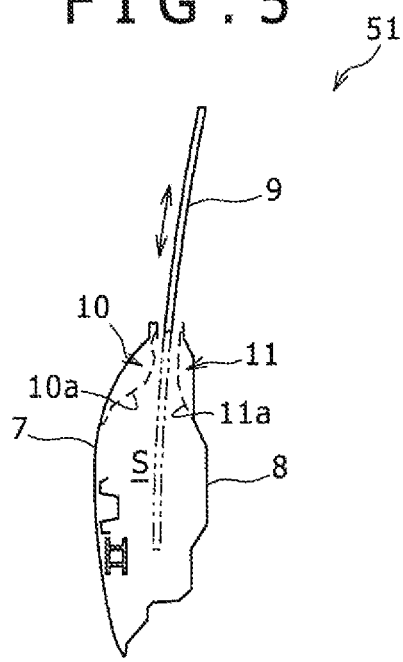
FIG. 5 is a view showing one embodiment of a door of the automobile to which the porous sound absorbing structure of the present invention is applied.

FIG. 5 is a view showing one example of a case where the porous sound absorbing structure of the present invention is applied to a door of the automobile. It should be noted that FIG. 5 is a sectional view of the door of the automobile.

As shown in FIG. 5, a door 51 is formed by bonding an outer material 7 (outside material) having a smooth curved shape and an inner material 8 (inside material) having an uneven shape at perimeter portions thereof by means of welding or the like. A window glass 9 is housed in a hollow portion S formed between the outer material 7 and the inner material 8.

A reinforcing plate material 10 having a large number of holes 10a (through holes) is fixed to a surface of the outer material 7 on the side of the hollow portion S in a mode where an air layer (behind air layer) is formed between the reinforcing plate material and the surface.

A reinforcing plate material 11 having a large number of holes 11a (through holes) is fixed to a surface of the inner material 8 on the side of the hollow portion S in a mode where an air layer (behind air layer) is formed between the reinforcing plate material and the surface.

A sound absorption coefficient of the reinforcing plate material 10 (11) is maximized with a particular frequency which is determined by a diameter of the holes 10a (11a), a pitch of the holes 10a (11a), and a distance between the reinforcing plate material 10 (11) and the outer material 7 (inner material 8) (thickness of the behind air layer). It should be noted that thickness of the behind air layer can be changed by a sectional shape of the reinforcing plate material 10 (11).

Materials of the outer material 7, the inner material 8, and the reinforcing plate material 10, and the reinforcing plate material 11 are aluminum or an aluminum alloy as well as the hood. It should be noted that other metal such as iron may also be used.

The reinforcing plate materials 10, 11 absorb a sound emitted from a vehicle interior to a vehicle exterior such as a sound from an in-vehicle audio, and a sound coming from the vehicle exterior to the vehicle interior such as road noises and wind noises.

(Analysis Result of Emitted Sound Reduction Effect)

Figure 6:
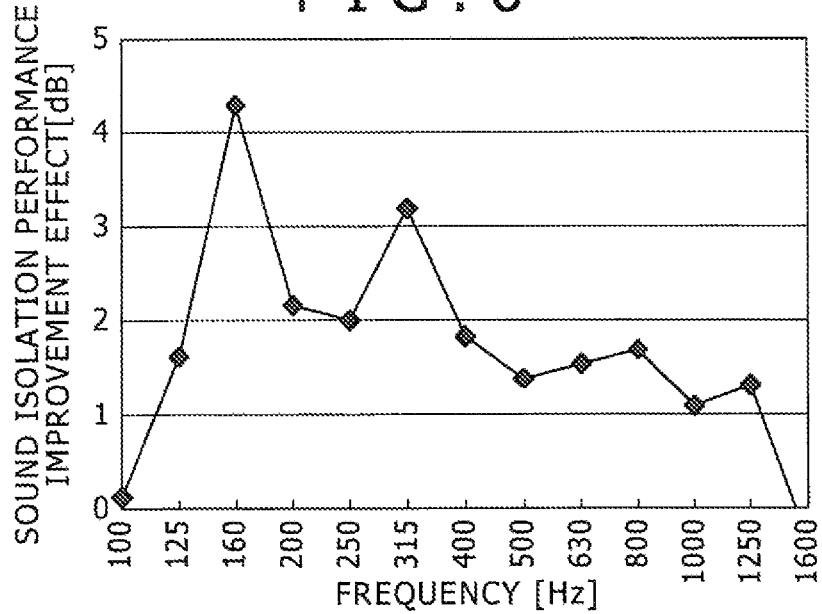
FIG. 6 is a graph showing a sound isolation property of the hood shown in FIGS. 1(a) and 1(b).

FIG. 6 is a graph showing a sound isolation property of the hood 1 shown in FIGS. 1(a) and 1(b). As seen from FIG.

6, by attaching the reinforcing plate material 4 provided with a large number of holes 5 to the surface of the outer material 2 on the side of the hollow portion S, the sound absorbing structure with the behind air layer of the decreased thickness can be formed more easily than the conventional example, so that a frequency range with which the sound absorption coefficient is great can be easily increased. Thereby, a sound emitted from an engine room to the vehicle exterior via the hood can be reduced.

FIG. 7 is a graph showing the sound absorbing property of the hood 102 shown in FIGS. 2(a) and 2(b). In a design of the sound absorption coefficient of the hood 102, the behind air layer, the hole diameter, an aperture ratio of the holes, and the like of the reinforcing plate material 4 are adjusted, so that the sound absorption coefficient of the sound of 1 kHz to 2 kHz is increased. As seen from FIG. 7, by providing the opening portions 3a for guiding the sound (sound waves) to the reinforcing plate material 4 to the surface of the inner material 3 to which the reinforcing plate material 4 faces, a sound absorbing effect by the reinforcing plate material 4 is more exhibited.

FIG. 8 is a graph showing the sound absorbing property of the hood 103 shown in FIGS. 3(a) and 3(b). In a design of the sound absorption coefficient of the hood 103, the behind air layer, the hole diameter, an aperture ratio of the holes, and the like of the reinforcing plate material 4 are adjusted, so that the sound absorption coefficient of the sound of 1 kHz to 2 kHz is increased by the reinforcing plate material 4. The hole diameter, an aperture ratio of the holes, and the like of the sound absorbing portion 12 of the inner material 3 are adjusted, so that the sound absorption coefficient of the sound of 1.25 kHz to 3.15 kHz is increased by the sound absorbing portion 12. As seen from FIG. 8, by providing the porous sound absorbing portion 12 in the inner material 3 itself in addition to provision of the opening portions 3a in the part of the inner material 3 to which the reinforcing plate material 4 faces, a sound absorbing effect by the inner material 3 itself can also be obtained in addition to the sound absorbing effect by the reinforcing plate material 4. Thereby, the sound absorbing performance can be improved in a wider frequency range.

(Application to Parts forming Automobile other than Hood and Door)

Figure 9:
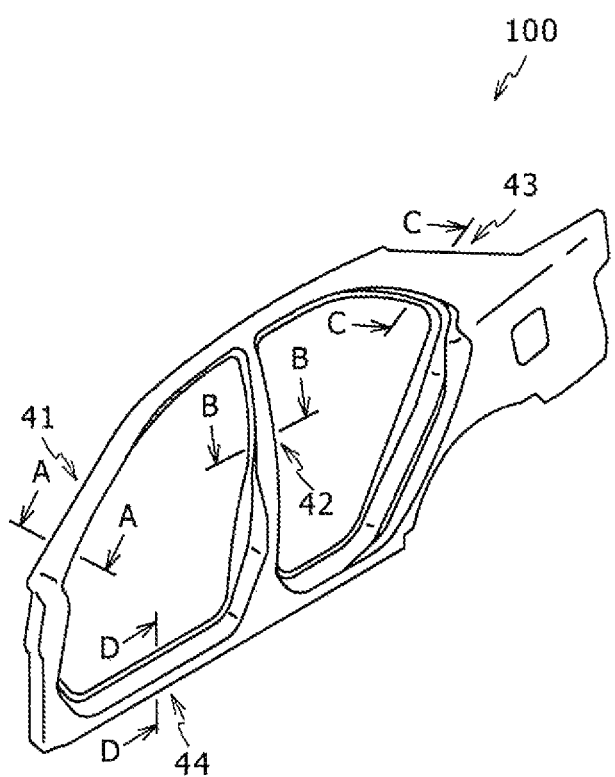
FIG. 9 is a perspective view showing a side body of the automobile.

FIG. 9 is a perspective view showing a side body 100 of the automobile. FIGS. 10(a), 10(b), 10(c), and 10(d) are a sectional view taken along the line A-A of the side body 100 shown in FIG. 9, a sectional view taken along the line B-B, a sectional view taken along the line C-C, and a sectional view taken along the line D-D, respectively.

Figure 10:
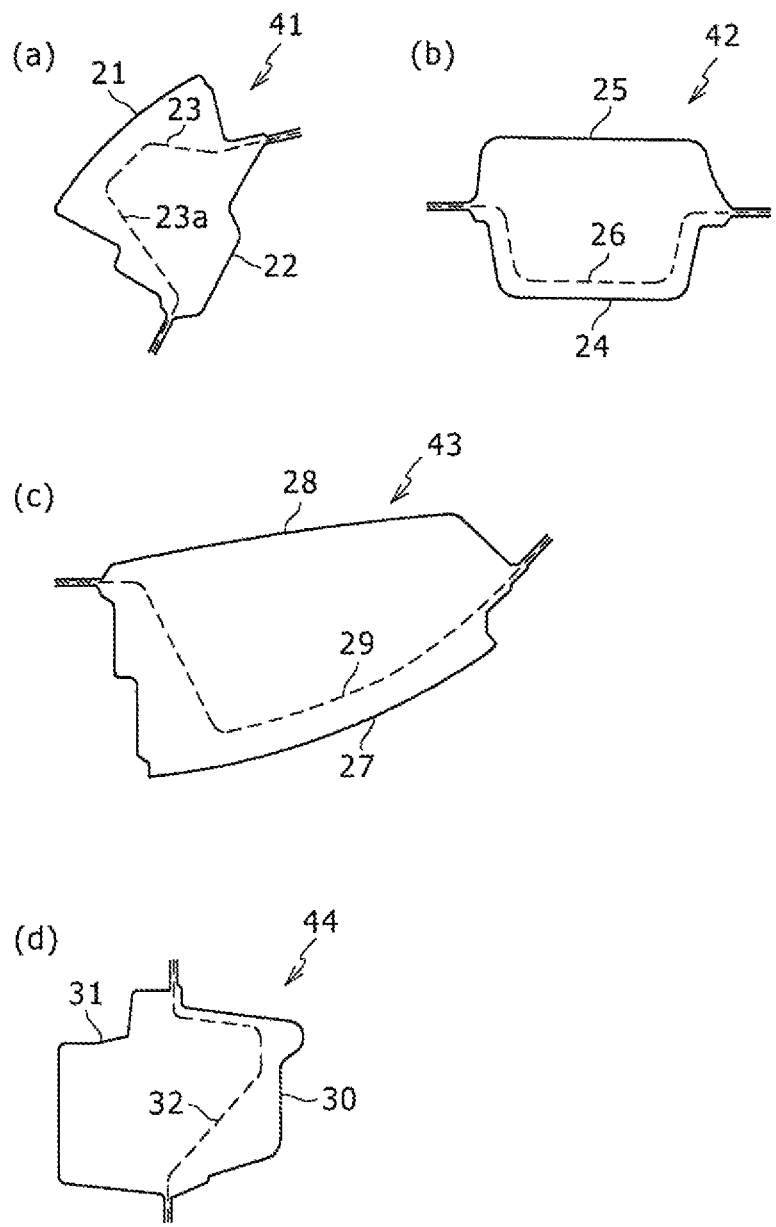
FIGS. 10(a), 10(b), 10(c), and 10(d) are a sectional view taken along the line A-A of the side body shown in FIG. 9, a sectional view taken along the line B-B, a sectional view taken along the line C-C, and a sectional view taken along the line D-D, respectively.

FIG. 10(a) is a sectional view of a front pillar 41 of the side body 100. The front pillar 41 is formed by bonding an outer material 21 (outside material) having a smooth curved shape and an inner material 22 (inside material) having an uneven shape at perimeter portions thereof by means of welding or the like. A reinforcing plate material 23 having a large number of holes 23a (through holes) is fixed to a surface of the outer material 21 on the side of a hollow portion in a mode where an air layer (behind air layer) is formed between the reinforcing plate material and the surface. By this reinforcing plate material 23, the sound absorbing property is given to an interior of the hollow portion between the outer material 21 and the inner material 22.

FIG. 10(b) is a sectional view of a center pillar 42 of the side body 100. As well as the front pillar 41 described above, the center pillar 42 is provided with an outer material 24, an inner material 25, and a reinforcing plate material 26 having a large number of through holes. By the reinforcing plate material 26, the sound absorbing property is given to an interior of a hollow portion between the outer material 24 and the inner material 25.

FIG. 10(c) is a sectional view of a rear pillar 43 of the side body 100. Regarding the rear pillar 43 as well, the rear pillar 43 is provided with an outer material 27, an inner material 28, and a reinforcing plate material 29 having a large number of through holes. By the reinforcing plate material 29, the sound absorbing property is given to an interior of a hollow portion between the outer material 27 and the inner material 28.

FIG. 10(d) is a sectional view of a side sill 44 of the side body 100. Regarding the side sill 44 as well, the side sill 44 is provided with an outer material 30, an inner material 31, and a reinforcing plate material 32 having a large number of through holes. By the reinforcing plate material 32, the sound absorbing property is given to an interior of a hollow portion between the outer material 30 and the inner material 31.

In such a way, the porous sound absorbing structure of the present invention can be applied to various parts forming the automobile. By applying the porous sound absorbing structure of the present invention, engine noises, road noises, wind noises, vehicle-interior resonance, and the like can be reduced.

A space in a vehicle-interior is desirably as large as possible. Thus, addition of a new part around the vehicle-interior is hard in terms of space. Therefore, a new part such as a sound absorbing material is not easily added. Meanwhile, in the present invention, the sound absorbing property is developed by providing the holes in the part originally required as a reinforcing member from a viewpoint to ensure strength. That is, according to the present invention, a sound insulation performance can be improved without adding a new part.

(Operations and Effects)

As described above with many examples, with the porous sound absorbing structure of the present invention, the reinforcing plate material is positioned between the outside material (outer material) and the inside material (inner material). Therefore, the thickness of the behind air layer of the reinforcing plate material is smaller than for example the thickness of the behind air layer of the porous inner material described in Patent Document 1 under the same conditions. When the thickness of the behind air layer is decreased, the reinforcing plate material having a large number of through holes absorbs a higher-frequency sound for a decreased amount of the thickness of the behind air layer.

The original function (role) of the reinforcing plate material is to reinforce the outside material and/or the inside material. By utilizing the reinforcing plate material, without adding a new member for giving the sound absorbing property to an object item, that is, easily, the sound absorbing property can be given to the object item. In such a way, according to the present invention, the frequency range with which the sound absorption coefficient is great can be easily increased without attaching a fiber sound absorbing material to a lower surface of the inner material (inside material).

In the present invention, an opening portion for guiding sound waves to the reinforcing plate material in the hollow portion between the outside material and the inside material is preferably provided in the outside material and/or the inside material. With this configuration, the sound waves are easily introduced to the reinforcing plate material, so that the sound absorbing effect by the reinforcing plate material is enhanced.

When the opening portion is provided at a position to face the reinforcing plate material, the sound waves are more easily introduced to the reinforcing plate material. Thus, the sound absorbing effect by the reinforcing plate material is further enhanced.

Further, when, by also providing a large number of through holes not only in the reinforcing plate material but also in the outside material and/or the inside material, the sound absorbing property is given to the outside material and/or the inside material itself, a sound absorbing effect in a different frequency band from the reinforcing plate material by the outside material and/or the inside material itself can be obtained in addition to the sound absorbing effect by the reinforcing plate material. Thereby, the sound absorbing performance can be improved in a wider frequency range.

It should be noted that in a case where porous processing is performed to the reinforcing plate material, the inside material, the outside material, and the like, a diameter d (mm) of the holes is preferably 0.7 t≤d≤1.3 t with thickness of the plate material to which the porous processing is performed is t (mm). It should be noted that the thickness t (mm) of the plate material is approximately 0.8 mm≤t≤1.2 mm. With the hole diameter in this range, for example perforation of punching processing can be easily performed, so that mass-productivity is improved.

Although the embodiments of the present invention are described above, the present invention is not limited to the above embodiments but can be variously changed and implemented according to the description of the claims. The present application is based on the Japanese patent application (Japanese Patent Application No. 2012-194106) filed on Sep. 4, 2012, and contents thereof are taken herein as a reference.

EXPLANATION OF REFERENCE NUMERALS

1: Hood
2: Outer material (outside material)
3: Inner material (inside material)
4: Reinforcing plate material
5: Hole (through hole)
S: Hollow portion

The invention claimed is:

1. A porous sound absorbing structure, comprising:
an outside material having a smooth curved shape;
an inside material having an uneven shape with a perimeter thereof combined with a perimeter of the outside material to form a hollow portion between the outside material and the inside material; and
a reinforcing plate material having a plurality of through holes, the reinforcing plate material being attached to an inner surface of at least any of the outside material and the inside material on the side of the hollow portion in such a manner that an air layer is formed between the reinforcing plate material and the inner surface, wherein
a sound absorbing property is given to an interior of the hollow portion by the reinforcing plate material, and
the reinforcing plate material being attached to and entirely positioned on an area of the at least any of the outside material and the inside material, and the reinforcing plate material being positioned closer to a first end of the hollow portion than to a second, opposite end of the hollow portion.

2. The porous sound absorbing structure of claim 1, wherein
an opening portion for guiding sound waves to the reinforcing plate material in the hollow portion is provided in at least any of the outside material and the inside material.

3. The porous sound absorbing structure according to claim 2, wherein
the opening portion is provided at a position to face the reinforcing plate material.

4. The porous sound absorbing structure according to claim 1, wherein a plurality of through holes are formed in at least any of the outside material and the inside material so that the sound absorbing property is given to at least any of the outside material and the inside material.

5. The porous sound absorbing structure according to claim 1, wherein plate thickness $t_1$ (mm) of the reinforcing plate material is $0.8 \leq t_1 \leq 1.2$, and
a diameter $d_1$ (mm) of the through holes provided in the reinforcing plate material is $0.7\, t_1 \leq d_1 \leq 1.3\, t_1$.

6. The porous sound absorbing structure according to claim 2, wherein
the reinforcing plate material is attached to the inner surface of the outside material on the side of the hollow portion and the opening portion is provided in the inside material.

7. The porous sound absorbing structure according to claim 6, wherein
a plurality of opening portions are provided in the inside material, each of the opening portions is facing the reinforcing plate material.

8. The porous sound absorbing structure according to claim 7, wherein
the reinforcing plate material is formed in a substantially oblong shape in a plan view and a sound absorbing portion with a large number of through holes is formed in the inside material where the position of the sound absorbing portion is set on the inside material closer to the second, opposite end of the hollow portion than to the first end such that the sound absorbing portion is displaced from the reinforcing plate material.

9. The porous sound absorbing structure according to claim 1, wherein
a sectional shape of the reinforcing plate material is such that the reinforcing plate material has two mountain portions and a valley portion in between such that the air layer is formed between a contour of the inner surface of the reinforcing plate material and the inner surface of the at least any of the outside material and the inside material.

10. The porous sound absorbing structure according to claim 4, wherein
a sound absorbing portion with a large number of through holes is formed in the inside material where the position of the sound absorbing portion is set on the inside material such that the sound absorbing portion is displaced from the reinforcing plate material.

11. The porous sound absorbing structure according to claim 1, wherein no opening portions are provided in the inside material and in the outside material.

12. The porous sound absorbing structure according to claim 1, wherein the reinforcing plate material has a plurality of mounting portions and at least one valley portion in a cross sectional view of the reinforcing plate material, such that the air layer is formed between the inner surface and the contour of the mounting portions and the valley portions such that the thickness of the air layer is not uniform at all locations of the reinforcing plate material.

13. The porous sound absorbing structure according to claim 1, wherein a glass is partially housed in the hollow portion and the reinforcing plate material is positioned between the glass and the at least any of the outside material and the inside material.

14. The porous sound absorbing structure according to claim 1, wherein the reinforcing plate material is a first reinforcing plate material that is attached to the outside material and a second reinforcing plate material having a plurality of through holes is attached to the inside material.

15. The porous sound absorbing structure according to claim 14, wherein the second reinforcing plate material is attached to and positioned entirely on an area of the inside material closer to the first end of the hollow portion than to the second, opposite end of the hollow portion.

16. The porous sound absorbing structure according to claim 15, wherein a glass is positioned in the hollow portion and at least a portion of the glass is positioned between the outside material and the inside material.

\* \* \* \* \*